US010060769B2

(12) United States Patent
Bereuter et al.

(10) Patent No.: US 10,060,769 B2
(45) Date of Patent: Aug. 28, 2018

(54) SCANNING MEASURING DEVICE WITH THERMALLY NEUTRAL AXIS (71) Applicant: LEICA GEOSYSTEMS AG, Heerbrugg (CH)

(72) Inventors: Klaus Bereuter, Alberschwende (AT); Karl Helmut Plangger, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 96 days.

(21) Appl. No.: 15/133,149

(22) Filed: Apr. 19, 2016

(65) Prior Publication Data

US 2016/0313148 A1    Oct. 27, 2016

(30) Foreign Application Priority Data

Apr. 22, 2015    (EP) .................................... 15164598

(51) Int. Cl.
*G01D 11/02* (2006.01)
*G01C 15/00* (2006.01)
(Continued)

(52) U.S. Cl.
CPC ............ *G01D 11/02* (2013.01); *F16C 19/548* (2013.01); *G01C 15/002* (2013.01); *G01D 5/26* (2013.01); *G01S 7/4817* (2013.01); *G01S 17/42* (2013.01); *F16C 19/163* (2013.01); *F16C 2240/34* (2013.01); *G01S 17/66* (2013.01)

(58) Field of Classification Search
CPC .............................. G01S 7/4817; G01S 17/42
See application file for complete search history.

(56) References Cited

U.S. PATENT DOCUMENTS 8,072,228 B2    12/2011    Meier
9,335,168 B2    5/2016    Kodaira et al.
(Continued)

FOREIGN PATENT DOCUMENTS

CN    101384881 A    3/2009
CN    201562075 U    8/2010
(Continued)

OTHER PUBLICATIONS

European Search Report dated Oct. 21, 2015 as received in Application No. 15164598.
(Continued)

*Primary Examiner* — Tony Ko
(74) *Attorney, Agent, or Firm* — Maschoff Brennan (57) ABSTRACT

A scanning measuring device, in particular a laser scanner, profiler, total station or tracker, comprising at least a base for the placement of the device, a housing mounted on the base, a shaft mounted in the housing such that it can rotate about an axis of rotation and bearing a beam deflection unit in a rotationally fixed manner, a beam generating unit, which generates a transmitted beam which is transmitted into the environment by the beam deflection unit, a beam receiving unit, which receives a received beam reflected from the environment, a controllable positioning means which drives the shaft, wherein the shaft is supported by at least one pair of angular contact rolling bearings set in an O arrangement, and the angular contact rolling bearings are arranged on the shaft such that the rolling contact lines of the associated angular contact rolling bearings meet substantially on the axis of rotation.

18 Claims, 7 Drawing Sheets

(51) Int. Cl.
*G01D 5/26* (2006.01)
*F16C 19/54* (2006.01)
*G01S 17/42* (2006.01)
*G01S 7/481* (2006.01)
F16C 19/16 (2006.01)
G01S 17/66 (2006.01)

(56) References Cited

U.S. PATENT DOCUMENTS

2012/0326709 A1 12/2012 Westermark et al.
2013/0308117 A1 11/2013 Bridges
2015/0002857 A1 1/2015 Fäs et al.

FOREIGN PATENT DOCUMENTS

CN 103940413 A 7/2014
EP 2 607 843 A1 6/2013

OTHER PUBLICATIONS

CN Office Action dated Feb. 23, 2018 as received in Application No. 201610251783.X.

SCANNING MEASURING DEVICE WITH THERMALLY NEUTRAL AXIS

FIELD OF THE INVENTION

The invention relates to a scanning measuring device.

BACKGROUND

In order to detect objects or surfaces, use is frequently made of methods which gradually scan the topography of a structure, such as a building, and record the same in the process. Here, such a topography constitutes a sequence of points that is coherent and describes the surface of the object or else a corresponding model or a description of the surface. A familiar approach is scanning by means of a laser scanner, which in each case detects the physical position of a surface point by the distance to the targeted surface point being measured by the laser and this measurement being linked with the angular information from the laser emission. From this distance and angular information, the physical position of the respectively detected point can be determined and the surface can be measured continuously. In many cases, in parallel with this purely geometric detection of the surface, it is also possible to make an image recording by means of a camera, which, in addition to the visual overall view, also provides further information, for example with reference to the surface texture.

In addition, other measuring devices such as profilers, total stations or laser trackers are generally likewise suitable for such scanning operations, wherein this is usually implemented via coaxial distance measuring elements or scanning elements and computing, control and storage units in the respective device. Depending on the configuration level of the measuring device, in addition motorization, for example of an aiming or sighting device—in the case of use of retro-reflectors (for example from an all-round prism) as target objects—can be integrated as means for automatic target searching and tracking.

Scanning measuring devices according to the prior art make it possible for a user to detect large surfaces and objects with relatively little expenditure of time—depending on a desired point-to-point resolution—completely and possibly with additional object information. In this case the devices are typically configured in such a way that primary point clouds with a large number of measuring points can be detected, and this detection is carried out with sufficient accuracy.

To this end, a very fast-rotating laser beam is emitted into the surroundings and the reflected light signal is evaluated in an appropriately frequency-based manner. Usually, this "scanning" laser beam rotates about a fast axis and about a slow axis (orthogonal to the first axis), which means that scanning is possible in all three spatial angles. In particular, the fast-rotating axis needs a rugged and exact mounting on account of the high rotational speeds. In this case, the precision must remain constant over a relatively long time period and over wide temperature ranges.

Previous total stations are operated with a plain bearing with regard to the elevation axis. In previous laser scanners, a conventional fixed/floating mounting is normally used, which is able to ensure a constant preload at most by additional elements, such as springs, sealing rings and further resilient bodies, also being incorporated as an integral constituent part of the mounting.

By means of these additional elements, in the case of thermally induced expansion of the bearing system, the floating bearing is kept in position in such a way that the mounting does not distort. These conventional mountings are complicated in planning and construction, need more parts and overall space and do not offer optimal rigidity.

The change in the preload within an operating temperature range is undesired since, in the event of an enlargement of the bearing play, the results of the measurement become inaccurate and since, in the case of too high a bearing preload, the increased friction leads to a greater power demand, which in particular is critical for battery operated, mobile measuring devices with a limited power capacity.

SUMMARY

Some embodiments of the present invention includes measuring device that is improved in this regard.

Some embodiments include a measuring device with fewer components and lower weight as a result, with increased field capability and in particular greater ruggedness, lower wear and higher accuracy.

The inventive solution is based on the design of the measuring device with at least one thermally neutral axis. This is implemented by a rigidly preloaded supporting mounting in an O arrangement. Such mountings are characterized by at least two angular contact rolling bearings (e.g. angular contact ball bearings, tapered roller bearings or shouldered ball bearings) which are preloaded against one another and which accordingly permit no or only slight axial and radial play. Their general advantages are, inter alia, a higher rigidity under radial and axial loads, a greater load-bearing capacity, lower angular play and lower susceptibility to thermal expansions. In addition, the bearing pair is matched such that thermal expansion of the components involved in the mounting as a result of the operation or as a result of a temperature change of the surroundings does not lead to any change in the preload but, in this regard, exhibits a compensatory behavior.

Despite the fixed-fixed bearing principle, the bearing preload, once set, is therefore constant over a very wide temperature range (between very low negative temperatures up to very high temperatures) and is therefore thermally neutral. A rotational angle of the rotor, once achieved and held, is therefore able to ensure constant precision with regard to the position. In addition, from the mounting according to the invention as compared with a conventional mounting, it follows that the rotor is capable of a more constant power consumption over a wide temperature range and can be positioned more precisely.

The preload of the mounting of the axis of rotation is defined by the dimensions of the mounted components, spring preloading not being necessary. Thus, for example, the preload can be "frozen" by adhesive bonding or by clamping the bearing rings, for example by means of union nuts. By means of these measures, the bearing spacing is fixed.

The position of a drive for the axis or shaft is arbitrary, can therefore be placed, for example, between the angular contact rolling bearings preloaded against each other or at one end of the shaft.

The angular contact rolling bearings are positioned at a distance from each other such that thermal expansions in the axial and radial direction are compensated, i.e. expand in a ratio corresponding to their spacing and their dimensions, so that the preload of the system does not change. This becomes possible as a result of the O arrangement of the angular contact rolling bearings. The contact pressure angle remains constant during the expansion or shrinkage of the system.

In the case of an angular contact ball bearing, the contact pressure line (in the axial section) extends at a contact pressure angle through the two points of contact of the rolling elements with the bearing rings (inner/outer). In the case of a tapered roller bearing, these contact pressure lines are perpendicular to the central axis of the rolling elements (tapered rollers). If these contact pressure lines are extended in the direction of the axis of rotation, then said lines meet at the so-called pressure midpoint, exactly on the axis of rotation. The distance of the pressure midpoint (of the two associated O-arranged bearings) defines the support base, which permits less angular play the greater it is.

If, in an analogous way, for example in a tapered roller bearing, the outer ring raceways are extended graphically in the direction of the axis of rotation, said lines likewise meet on the axis of rotation but in the opposite direction (as compared with the contact pressure lines). In addition, lines which originate from the mid-axis of the tapered rollers (and also lines which originate from the raceway of the tapered roller on the bearing inner ring) will meet at this point on the axis of rotation. However, this (extended mid-axis of the tapered rollers that are circulating) is exactly perpendicular to the contact pressure line of the respective tapered roller bearing. These lines of a respective bearing, meeting at a point, are to be understood as rolling contact lines.

If rolling contact lines of two tapered roller bearings installed in an O arrangement and therefore associated with each other meet each other at a point on the axis of rotation, then, as is known, radial and axial play compensate each other (possibly under further preconditions), so that the preload is maintained.

In a similar way, this effect can also be achieved with angular contact ball bearings, specifically when the meeting point of rolling contact lines of mutually associated angular contact ball bearings, viewed radially, is located substantially on the axis of rotation. This means that the meeting point of the rolling contact lines is at a distance from the axis of rotation which corresponds to at most 10%, in particular at most 5%, of the bearing spacing.

These rolling contact lines are at right angles to the contact pressure lines of the respective bearing and extend through the rolling element (ball), i.e., for example, through the ball center, through the contact region of the balls on the bearing inner ring or through the contact region of the balls on the bearing outer ring.

If the angular contact ball bearings are highly preloaded, it is possible that the contact pressure line, defined as a connecting line of the two points of contact of the bearing balls with the bearing rings, no longer extends through the ball center. The force flow lines, however, must extend in the direction of the ball center, mechanically necessitated by the bearing ring; the force equilibrium is maintained only on account of the friction. In this case (preloaded state), as opposed to the unloaded state, it is possible for the contact pressure line to experience a minimum bend at the ball center, which means that to some extent the previously defined rolling contact lines no longer run parallel to one another.

In the event of thermally induced expansion of the shaft, the bearing rings, the rolling elements and the housing, the bearings move away from each other, viewed axially, and expand radially. The meeting point of the rolling contact lines of the mutually associated angular contact ball bearings placed in an O arrangement remains at a fixed point on the shaft (on the axis of rotation), thanks to the compensatory expansion behavior. As a result, the preloading forces and the force flow relationships remain constant.

BRIEF DESCRIPTION OF THE DRAWINGS

The device according to the invention will be described in more detail below, purely by way of example, by using practical exemplary embodiments illustrated schematically in the drawings; further advantages of the invention will also be enlarged upon. In detail.

DETAILED DESCRIPTION

Figure 1:
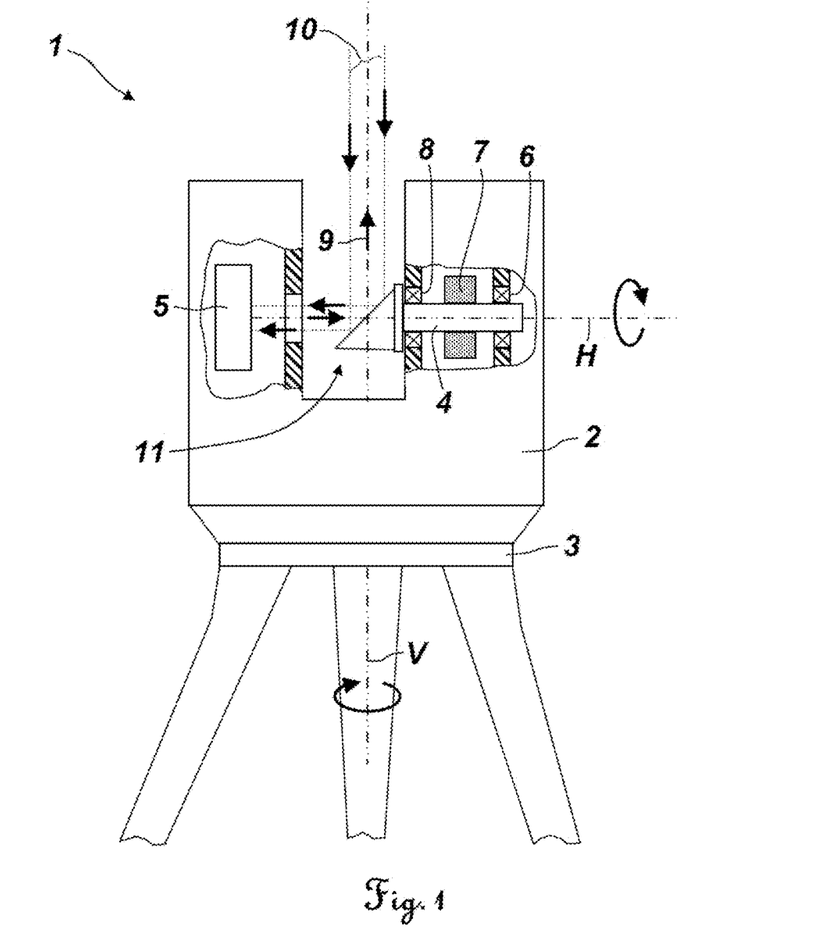
FIG. 1 shows an exemplary embodiment of a measuring device according to the invention as a laser scanner.

FIG. 1 shows an embodiment of a measuring device 1 according to the invention, namely a laser scanner with a fast-rotating horizontal axis H for emitting a laser beam and a slow vertical axis V for the azimuthal 360° rotatability of an environment. The measuring device 1 also has a housing 2, which is mounted on the base 3 such that it can rotate about the base axis V, and a beam deflection unit 11, which is mounted in the housing 2 by means of a shaft 4 such that it can rotate about the axis of rotation H. Positioned in the housing 2 are a beam transmitting and a beam receiving unit, which are combined in one unit 5 in the example shown. Here, a transmitted beam 9 is emitted onto the beam deflection unit 11 and transmitted out into the environment via the latter. The reflected received beam 10 is deflected back in the same way onto the beam receiving unit 5. In order to emit the transmitted beam 9 out of the housing 2 onto the beam deflection unit 11, an optically open passage area is provided in the housing 2, in particular in the form of a window. The radial and axial mounting of the shaft 4 is implemented via the two bearings 6 and 8, and the drive of the shaft 4 by the positioning means 7.

The scanning measuring device 1 therefore has at least a base 3 for the placement of the device 1, a housing 2 mounted on the base 3, a shaft 4 mounted in the housing 2 such that it can rotate about an axis of rotation H and bearing a beam deflection unit 11 in a rotationally fixed manner, a beam generating unit 5, which generates a transmitted beam 9, which is transmitted into the environment via the beam deflection unit 11, a beam receiving unit 5, which receives a received beam 10 reflected from the environment, a controllable positioning means 7 driving the shaft 4, wherein the shaft 4 is supported by at least one pair of angular contact rolling bearings 6 and 8 set in an O arrangement, and the angular contact rolling bearings 6 and 8 are arranged on the shaft 4 such that the rolling contact lines of the associated angular contact bearings 6 and 8 meet substantially on the axis of rotation H.

Furthermore, the meeting point of the rolling contact lines has a spacing with respect to the axis of rotation H which corresponds at most to 10%, in particular at most to 5%, of the bearing spacing.

The shaft 4 can, for example, be mounted on one side in the housing 2; the beam deflection unit 11 being arranged at one end of the shaft 4. On the other hand, the shaft 4 can also be mounted on both sides in the housing 2, the beam deflection unit 11 then being arranged on or in the shaft so as to be interposed with respect to the mounting.

The rolling contact line is perpendicular to the contact pressure line and extends through the rolling element, in particular through the rolling element center, the contact region of the rolling element with the bearing outer ring, or the contact region of the rolling element with the bearing inner ring.

The angular contact rolling bearings can in this case be angular contact ball bearings, in particular spindle bearings, and/or tapered roller bearings. The angular contact rolling bearings can also have the same or different bearing rolling circle diameter/s. Furthermore, the angular contact rolling bearings can either have the same or else different contact pressure angles. These contact pressure angles are between 15° and 30°, in particular 25°.

The bearing inner rings of the angular contact rolling bearings, can be adhesively bonded, brazed or clamped to the shaft 4 and/or the bearing outer rings of the angular contact rolling bearings can be adhesively bonded, brazed or clamped to a component combined with the housing 2 or to the housing 2 itself.

The beam deflection unit 11 has a beam optical unit, in particular a mirror, for deflecting the transmitted beam 9 coming from the beam generating unit 5 out of the housing 2, and the received beam 10 coming from the environment to the beam receiving unit 5.

Figure 2:
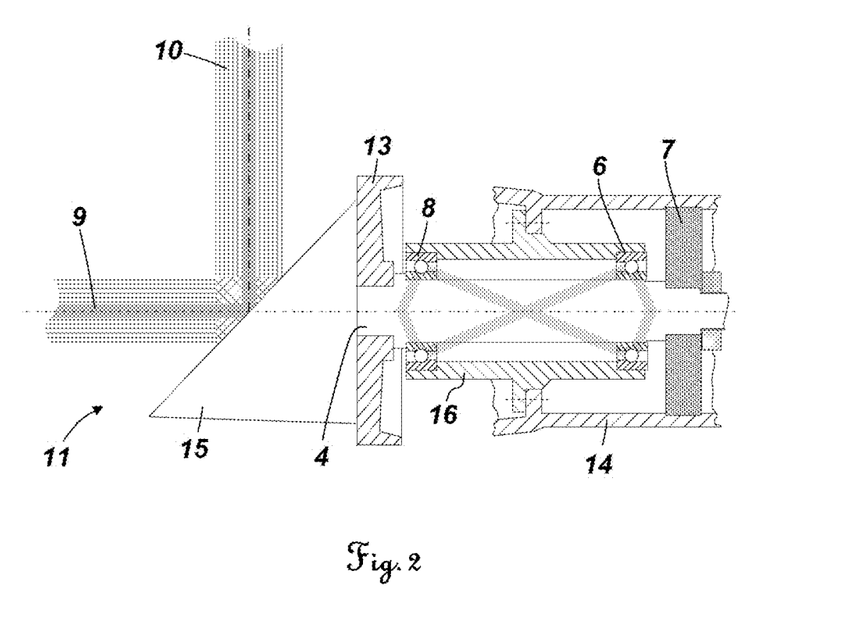
FIG. 2 shows the mounting of the fast axis of rotation of the laser scanner according to the invention in a more detailed sectional illustration.

FIG. 2 shows a sectional illustration of the beam deflection unit 11 and its mounting via the shaft 4. The beam deflection unit 11 essentially comprises a beam optical unit 15, which is fixed to a holder 13, wherein the beam deflection unit 11 can have further elements, not shown, for mass compensation. Via the beam optical unit 15, which is in particular a mirror, both the transmitted beam 9 and the received beam 10 are deflected. The transmitted beam 9 can thus emerge from the measuring device 1, and the received beam 10 can likewise enter the latter. The holder 13 is in turn connected to the shaft 4, which is motorized by the drive unit 7. The shaft 4 is mounted via the angular contact ball bearings 6, 8, which are arranged in the O position and the outer rings of which are fitted into a bearing block 16. The bearing block 16 is in turn fixed to the housing body 14. This fixed-fixed mounting is distinguished by the fact that its rolling contact lines meet substantially at a point on the axis of rotation H. The bracing of the bearings can be fixed or "frozen", for example with the aid of sleeves, nuts and/or an adhesive or brazing material.

Figure 3:
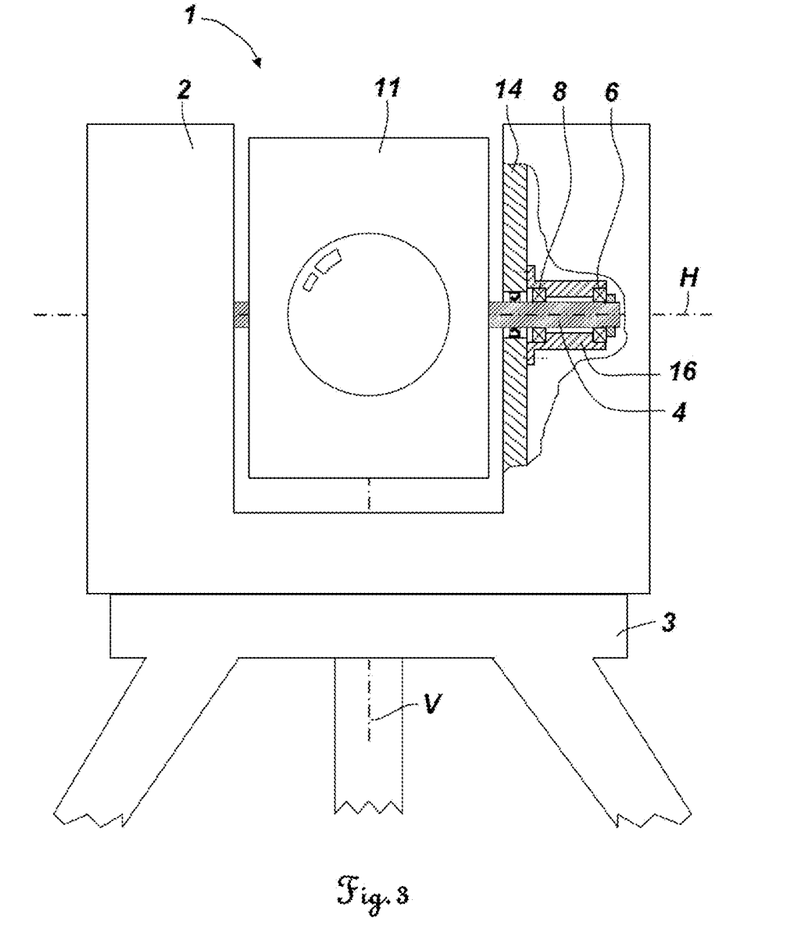
FIG. 3 shows a further exemplary embodiment of a measuring device according to the invention as a scanning total station.

FIG. 3 shows a further exemplary embodiment of the invention in a scanning total station 1. The beam deflection unit 11 is mounted between limbs of the housing 2 by means of the shaft 4. The shaft 4 can thus be rotated rapidly around the horizontal axis of rotation H. The mounting according to the invention is implemented here in at least one limb of the housing 2.

Figure 4A:
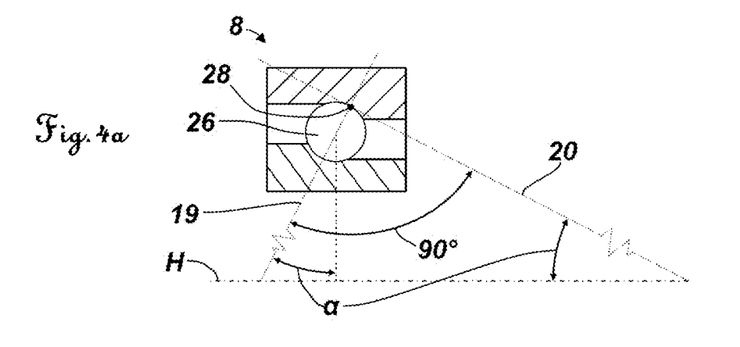
FIGS. 4a-c show contact pressure angles and rolling contact lines related thereto on an angular contact ball bearing.

FIG. 4*a* shows the section through an angular contact ball bearing 8 ("top left"). Shown here is the contact pressure angle α, which indicates the direction of action of the force of the bearing. It is enclosed by the contact pressure line 19 and the center line of the bearing, which extends through the ball center and at right angles to the axis of rotation H. The contact pressure line 19 is defined such that it extends through the two contact points of the ball with the two bearing rings (outer and inner). Rotated at a 90° angle with respect to the contact pressure line 19 is the rolling contact line 20 extending through the contact region 28 between the bearing ball 26 and bearing outer ring 20. In turn, the angle α can be measured between this rolling contact line 20 and the axis of rotation H.

Figure 4B:
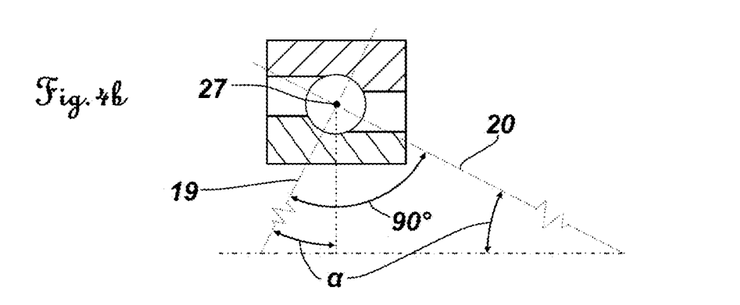

FIG. 4*b* shows the section from FIG. 4*a* with the difference that the rolling contact line 20 extends through the center 27 of the bearing ball 26.

Figure 4C:
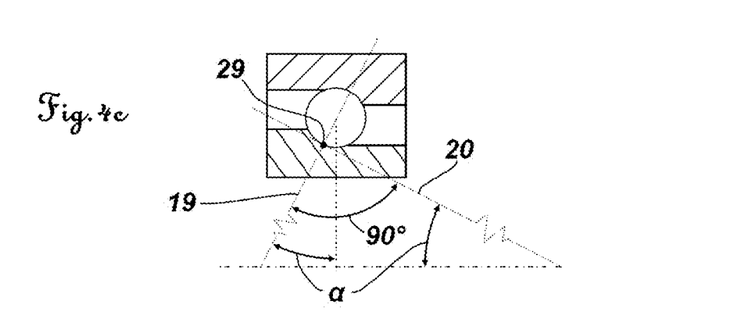

FIG. 4*c* shows the section from FIG. 4*a* with the difference that the rolling contact line 20 extends through the contact region 29 between bearing ball 26 and bearing inner ring 29.

Figure 5A:
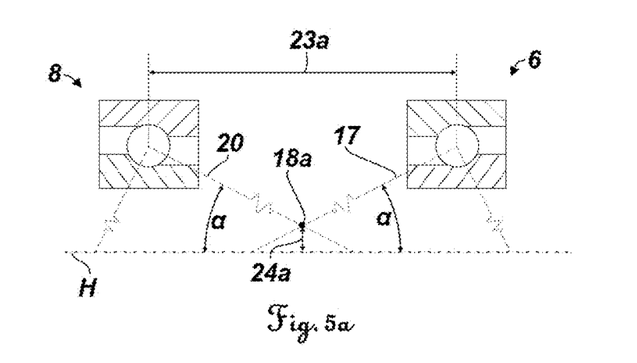
FIGS. 5a-b show meeting points of the rolling contact lines of the associated angular contact ball bearings arranged in an O position, and the spacing thereof in relation to the axis of rotation.

FIG. 5*a* shows, in partly shortened dimensions (zigzag symbols on the lines), the contact pressure lines and the rolling contact lines of the two associated angular contact ball bearings, only the "upper" half of the symmetry with regard to the axis of rotation H being shown. Here, it is possible to see the meeting point 18*a* of the rolling contact lines 20 and 17, which, on account of too close a spacing 23*a* of the two bearings and 6, is still located above the axis of symmetry (axis of rotation H). The result is therefore a spacing 24*a* between meeting point 18*a* of the rolling contact lines 20 and 17, on the one hand, and the axis of rotation H, on the other hand.

Figure 5B:
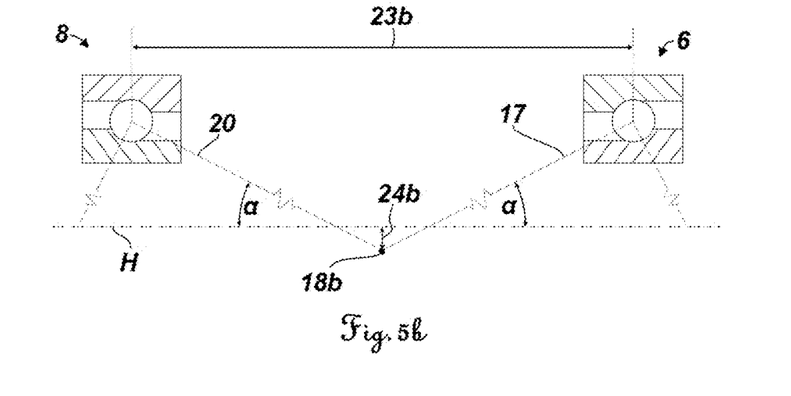

FIG. 5*b* shows a configuration from FIG. 5*a* with the difference that the bearing spacing 23*b* is now so great that the meeting point 18*b* of the rolling contact lines 20 and 17 is located below the axis of rotation H. The result is a spacing 24*b* between the meeting point 18*b* and the axis of rotation H.

Figure 6A:
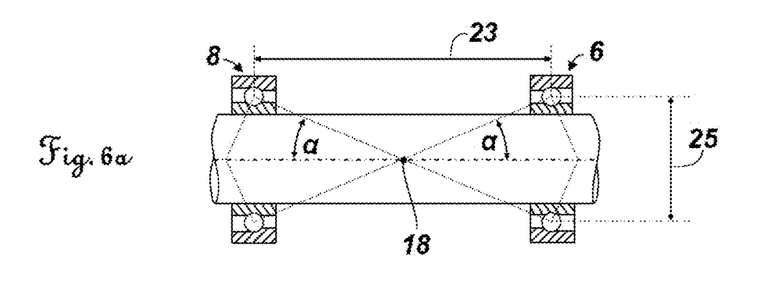
FIGS. 6a-b show thermally induced expansion behavior of the bearing system and constant and changing mass.
Figure 6B:
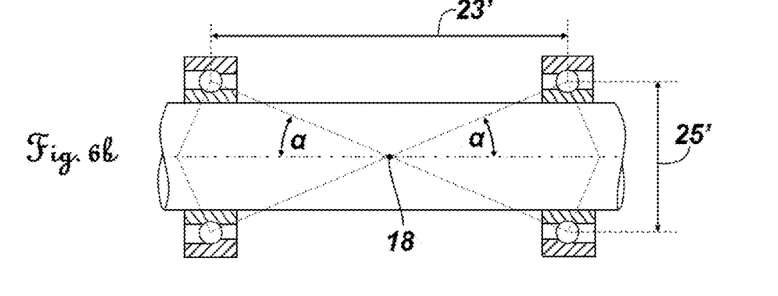

According to the invention, the magnitudes of the spacings 24*a* and 24*b* are smaller than or equal to 10% of the respective bearing spacing 23*a* or 23*b* and they are preferably close to zero, which means that the meeting points 18*a* and 18*b* are located on the axis of rotation H. FIGS. 6*a* and 6*b* illustrate schematically how the bearing system widens in the event of a temperature increase. The bearings 6 and 8 move axially apart from each other (bearing spacing 23->23') and also widen radially (bearing rolling circle diameter 25->25'). As a result of the bearing arrangement according to the invention, this takes place in such a ratio that the meeting point 18 of the rolling contact lines remains the same in a fixed location on the shaft.

Figure 7:
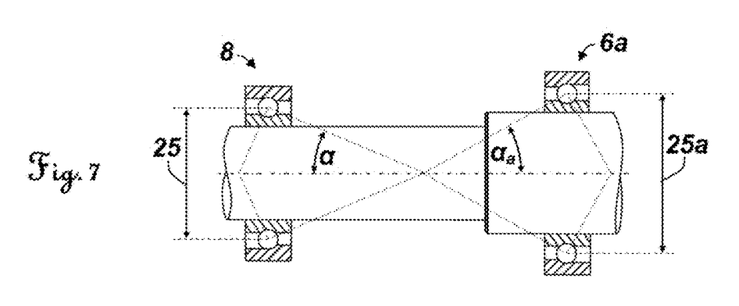
FIG. 7 shows a further exemplary embodiment of the mounting according to the invention.

FIG. 7 shows the possibility according to the invention of combining bearings with different diameters and with different contact pressure angles with one another. Bearing 6*a* has a larger bearing rolling circle diameter 25*a* and a larger contact pressure angle $\alpha_a$ than bearing 8.

Figure 8:
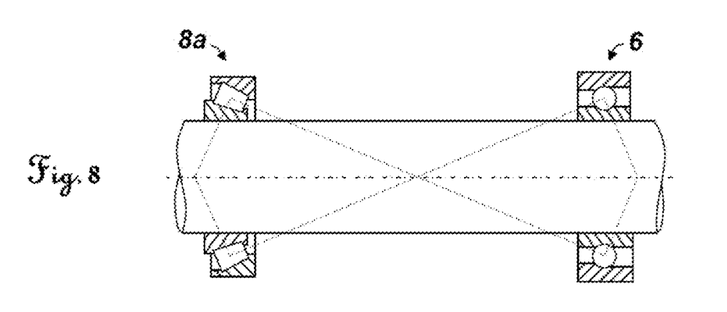
FIG. 8 shows a further exemplary embodiment of the mounting according to the invention.

FIG. 8 shows the possibility according to the invention of combining angular contact bearings of different design with one another. Bearing 8*a* is an angular contact roller bearing, which is in the arrangement according to the invention in relation to bearing 6.

It goes without saying that the figures shown and explained above merely illustrate possible exemplary embodiments schematically. The use of the thermally neutral mounting can likewise take place at a different point in a measuring device, in particular in a laser scanner, profiler, theodolite, rotary laser, leveling device, wherein in particular mirrors, prisms, cameras, light sources or modules bearing such components can be supported. It is also pointed out that the examples explicitly illustrated and explained can without exception be used both separately from one another and also in any desired combination with one another and can also be combined with appropriate devices and methods from the prior art.

What is claimed is:

1. A scanning measuring device, comprising:
   a base for the placement of the device,
   a housing mounted on the base,
   a shaft mounted in the housing such that it can rotate about an axis of rotation and bearing a beam deflection unit in a rotationally fixed manner,
   a beam generating unit, which generates a transmitted beam which is transmitted into the environment by the beam deflection unit,
   a beam receiving unit, which receives a received beam reflected from the environment,
   a controllable positioning means which drives the shaft, wherein:
   the shaft is supported by at least one pair of angular contact rolling bearings set in an O arrangement, and
   the angular contact rolling bearings are arranged on the shaft such that a rolling contact line of the associated angular contact rolling bearings meet substantially on the axis of rotation,
   wherein the rolling contact line is perpendicular to the contact pressure line and extends through the rolling element.

2. The measuring device as claimed in claim 1, wherein the measuring device comprises a laser scanner, profiler, total station, or a tracker.

3. The measuring device as claimed in claim 1, wherein: the meeting point of the rolling contact lines has a spacing with respect to the axis of rotation which corresponds at most to 10% of the bearing spacing.

4. The measuring device as claimed in claim 1, wherein: the meeting point of the rolling contact lines has a spacing with respect to the axis of rotation which corresponds at most to 5% of the bearing spacing.

5. The measuring device as claimed in claim 1, wherein: the shaft is mounted on one side in the housing, wherein the beam deflection unit is arranged at one end of the shaft.

6. The measuring device as claimed in claim 1, wherein: the shaft is mounted on both sides in the housing, wherein the beam deflection unit is arranged on or in the shaft so as to be interposed with respect to the mounting.

7. The measuring device as claimed in claim 1, wherein: the rolling contact line further extends through:
   the rolling element center,
   the contact region of the rolling element with the bearing outer ring, or
   the contact region of the rolling element with the bearing inner ring.

8. The measuring device as claimed in claim 1, wherein the angular contact rolling bearings are angular contact ball bearings.

9. The measuring device as claimed in claim 1, wherein: the angular contact rolling bearings are spindle bearings.

10. The measuring device as claimed in claim 1, wherein: the angular contact rolling bearings are tapered roller bearings.

11. The measuring device as claimed in claim 1, wherein: the angular contact rolling bearings have the same bearing rolling circle diameter.

12. The measuring device as claimed in claim 1, wherein: the angular contact rolling bearings have different bearing rolling circle diameters.

13. The measuring device as claimed in claim 1, wherein: the angular contact rolling bearings have the same contact pressure angle.

14. The measuring device as claimed in claim 1, wherein: the angular contact rolling bearings have different contact pressure angles.

15. The measuring device as claimed in claim 1, wherein: the angular contact rolling bearings have a contact pressure angle of between 15° and 30°.

16. The measuring device as claimed in claim 1, wherein: the angular contact rolling bearings have a contact pressure angle of 25°.

17. The measuring device as claimed in claim 1, wherein: the bearing inner rings of the angular contact rolling bearings are adhesively bonded, brazed or clamped to the shaft and/or
   the bearing outer rings of the angular contact rolling bearings are adhesively bonded, brazed or clamped to a component combined with the housing or to the housing itself.

18. The measuring device as claimed in claim 1, wherein: the beam deflection unit has a beam optical unit for deflecting the transmitted beam coming from the beam generating unit out of the housing, and the received beam coming from the environment to the beam receiving unit.

* * * * *